US008739892B2

(12) United States Patent
Moore et al.

(10) Patent No.: US 8,739,892 B2
(45) Date of Patent: Jun. 3, 2014

(54) FIREFIGHTING VEHICLE (75) Inventors: Michael R. Moore, Larsen, WI (US);
Chad Trinkner, Neenah, WI (US); John Schultz, Appleton, WI (US); Andrew Fochs, Appleton, WI (US)

(73) Assignee: Pierce Manufacturing Company, Appleton, WI (US)

( * ) Notice: Subject to any disclaimer, the term of this patent is extended or adjusted under 35 U.S.C. 154(b) by 661 days.

(21) Appl. No.: 13/018,223

(22) Filed: Jan. 31, 2011

(65) Prior Publication Data
US 2012/0193109 A1    Aug. 2, 2012

(51) Int. Cl.
*A62C 27/00*    (2006.01)
*B60K 11/04*    (2006.01)
*B60K 5/02*    (2006.01)
*B60K 7/00*    (2006.01)
*B62D 33/06*    (2006.01)
*B60H 1/00*    (2006.01)

(52) U.S. Cl.
USPC ...... 169/24; 180/68.4; 180/89.16; 180/89.19; 180/291; 165/41

(58) Field of Classification Search
USPC ........ 169/24; 180/58, 68.1, 68.4, 89.1, 89.11, 180/89.13–89.19, 291; 165/41
See application file for complete search history.

(56) References Cited

U.S. PATENT DOCUMENTS

| 1,376,467 A | 5/1921 | Simmon |
| 1,463,569 A | 7/1923 | Bathrick |
| 2,916,997 A | 12/1959 | Terrie |
| 3,083,790 A | 4/1963 | McAfee et al |
| 3,188,966 A | 6/1965 | Tetlow |
| 3,500,961 A | 3/1970 | Eberhardt et al. |
| 3,715,001 A * | 2/1973 | Wilson ........................ 180/68.4 |
| 3,726,308 A | 4/1973 | Eberhardt |
| 4,059,170 A | 11/1977 | Young |
| 4,118,151 A | 10/1978 | Murakami et al. |
| 4,157,733 A | 6/1979 | Ewers et al. |
| 4,337,830 A | 7/1982 | Eberhardt |
| 4,563,124 A | 1/1986 | Eskew |
| 4,586,743 A | 5/1986 | Edwards et al. |
| 4,587,862 A | 5/1986 | Hoffman |

(Continued)

FOREIGN PATENT DOCUMENTS

| JP | 2000-107313 | 4/2000 |
| WO | WO-03/049987 A2 | 6/2003 |

OTHER PUBLICATIONS

Graphic image of what is understood by Applicants to be a 1923 Seagrave from the City of Los Angeles Fire Department in which the driver of the vehicle, in a non-tilt open truck cab, sat in a seat positioned over a fire pump (1 photograph, one sheet).

(Continued)

*Primary Examiner* — Darren W Gorman
(74) *Attorney, Agent, or Firm* — Foley & Lardner LLP (57) ABSTRACT A firefighting vehicle is disclosed that includes a chassis and a front wheel assembly coupled to the chassis. The front wheel assembly has at least one front wheel defining an axis of rotation that is substantially perpendicular to the chassis when in a straight position. The firefighting vehicle also includes an operator cab supported at a front portion of the chassis. The firefighting vehicle further includes an engine supported by the chassis. The engine is disposed under the operator cab and at least partially rearward of the axis of rotation.

11 Claims, 8 Drawing Sheets

(56) References Cited

U.S. PATENT DOCUMENTS

| | | | |
|---|---|---|---|
| 4,811,804 | A | 3/1989 | Ewers et al. |
| 4,945,780 | A | 8/1990 | Bosma |
| 5,145,014 | A | 9/1992 | Eberhardt |
| 5,326,232 | A | 7/1994 | McDonnel et al. |
| 6,161,643 | A | 12/2000 | Bober et al. |
| 6,782,965 | B2 | 8/2004 | Sztykiel et al. |
| 7,784,554 | B2 | 8/2010 | Grady et al. |
| 2005/0099885 | A1 | 5/2005 | Tamminga |
| 2005/0196269 | A1 | 9/2005 | Racer et al. |
| 2007/0286736 | A1 | 12/2007 | Grady et al. |
| 2009/0218108 | A1 | 9/2009 | Cano |
| 2010/0038098 | A1 | 2/2010 | Groonwald |

OTHER PUBLICATIONS

Graphic image of what is understood by Applicants to be a late 1930s American LaFrance from the City of Topeka Fire Department in which a fire pump is mounted in a cowl area of a non-tilt truck cab (1 photograph, one sheet).

Graphic image of what is understood by Applicants to be a 1938 American LaFrance Duplex from the City of Los Angeles Fire Department in which a first fire pump is mounted in a cowl area of a non-tilt truck cab, and is operated by the chassis engine, and a second fire pump is mounted behind the truck cab, and is operated by another engine mounted in the rear body (1 photograph, one sheet).

Graphic image of what is understood by Applicants to be a Kenworth chassis possibly build by one of Neep, Roney, Howard Cooper, Hiser Bodywords and/or Western States between the 1950s and the 1980s in which a canopy extending from the rear of a non-tilt truck cab covers a fire pump (1 photograph, one sheet).

Graphic images of what is understood by Applicants to be 1969 Western States from the Cornelius and/or Forest Grove Fire Department in which a fire pump is mounted into the front end of a non-tilt truck cab and the chassis is powered by a mid-engine (3 photographs, one sheet).

Graphic images of what is understood by Applicants to be 1993 Western States from the Cornelius Fire Department in which a fire pump is mounted into the front end of a tilt truck cab that does not move when the cab tilts (2 photographs, one sheet).

Promotional materials for "CBP, AP, and PSD Series Rear Mount Fire Pumps"; Hale Products, Inc., Conshohocken, Pennsylvania; printed from website http://www.haleproducts.com; Rev. 2 dated 2002 (one sheet).

Promotional materials for "RM Series Rear Mount Fire Pumps"; Hale Products, Inc., Conshohocken, Pennsylvania; printed from website http://www.haleproducts.com; Rev. 2 dated 2002 (one sheet).

Promotional materials for "S100 Fire Pump"; Waterous Company, South St. Paul, Minnesota; printed from website http://www.waterousco.com; Rev. dated Dec. 17, 2004 (two sheets).

International Preliminary Report on Patentability for international application PCT/US2012/022967, dated Aug. 6, 2013, 5 pages.

International Search Report and Written Opinion for International Application No. PCT/US2012/022967, mail date Aug. 17, 2012, 6 pages.

\* cited by examiner

FIREFIGHTING VEHICLE

BACKGROUND

The present application relates generally to the field of firefighting vehicles which are configured to pump or otherwise deliver a firefighting agent or suppressant. More specifically, the present application relates to the positioning of an engine within such a firefighting vehicle and/or the configuration of an operator cab for such a firefighting vehicle.

Firefighting vehicles come in a variety of different forms. For example, certain firefighting vehicles, known as pumpers, are designed to deliver large amounts of firefighting agents, such as water, foam, or any other suitable fire suppressant to an area of interest. One or more of the firefighting agents may be retrieved from a tank carried by the firefighting vehicle and/or may be retrieved from a source external the firefighting vehicle (e.g., hydrant, pond, etc.). Other firefighting vehicles, known as tankers, are designed to hold and/or transport relatively large quantities of firefighting agents. Still other firefighting vehicles, known as aerials, are designed to additionally elevate ladders or booms. Further still, some firefighting vehicles, known as specialized firefighting vehicles, are designed for responding to unique firefighting circumstances and may be designed for delivering firefighting agents to difficult to reach locations (e.g., airport rescue, etc.).

SUMMARY

One embodiment of the invention relates to a firefighting vehicle including a chassis and a front wheel assembly coupled to the chassis. The front wheel assembly has at least one front wheel defining an axis of rotation that is substantially perpendicular to the chassis when in a straight position. The firefighting vehicle also includes an operator cab supported at a front portion of the chassis. The operator cab has a floor section extending laterally across a width of the operator cab in an area of a driver seat and passenger seat that is forward of the axis of rotation. The floor section is substantially flat and has a height that is less than approximately 40 inches from a ground surface. The firefighting vehicle further includes an engine supported by the chassis. The engine is disposed under the operator cab and at least partially rearward of the axis of rotation.

Another embodiment of the invention relates to a firefighting vehicle including a chassis and a front wheel assembly coupled to the chassis. The front wheel assembly has at least one front wheel defining an axis of rotation that is substantially perpendicular to the chassis when in a straight position. The firefighting vehicle also includes an operator cab supported at a front portion of the chassis, an engine supported by the chassis under the operator cab and at least partially rearward of the axis of rotation and a cooling system coupled to the engine and having a heat exchanger. The heat exchanger is supported rearward of the operator cab.

Another embodiment of the invention relates to a firefighting vehicle including a chassis and a front wheel assembly coupled to the chassis. The front wheel assembly has at least one front wheel defining an axis of rotation that is substantially perpendicular to the chassis when in a straight position. The firefighting vehicle also includes an operator cab supported at a front portion of the chassis. The operator cab has a floor section extending laterally across a width of the operator cab in an area forward of the axis of rotation. The floor section is substantially flat. The firefighting vehicle also includes an engine supported by the chassis. The engine is disposed under the operator cab with a front end of the engine being positioned rearward of the axis of rotation.

DETAILED DESCRIPTION

Referring generally to the FIGURES, a firefighting vehicle and components thereof are shown according to an exemplary embodiment. The firefighting vehicle generally includes a chassis that supports a front wheel assembly having at least one front wheel that defines an axis of rotation perpendicular to the chassis. The chassis also supports an operator cab at a front portion of the chassis and an engine disposed under the operator cab. At least a portion of the engine is positioned rearward of the axis of rotation. The firefighting vehicle also includes a cooling system coupled to the engine and a fire pump for distributing a firefighting agent. According to an exemplary embodiment, the cooling system may be positioned rearward of the operator cab and/or the fire pump may be at least partially disposed under the operator cab. Positioning the engine, cooling system and/or fire pump in this manner may increase space or clearance available in the operator cab for such things as seats, occupants, equipment, etc., and may also facilitate servicing, improve vehicle handling, improve vehicle maneuverability and/or reduce noise levels inside the operator cab.

Before discussing further details of the firefighting vehicle, it should be noted that references to "front," "back," "rear," "upper," "lower," "right," and "left" in this description are merely used to identify the various elements as they are oriented in the FIGURES, with "front," "back," and "rear" being relative to the direction of travel of the vehicle. These terms are not meant to limit the element which they describe, as the various elements may be oriented differently in various applications.

It should further be noted that for purposes of this disclosure, the term coupled means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Figure 1:
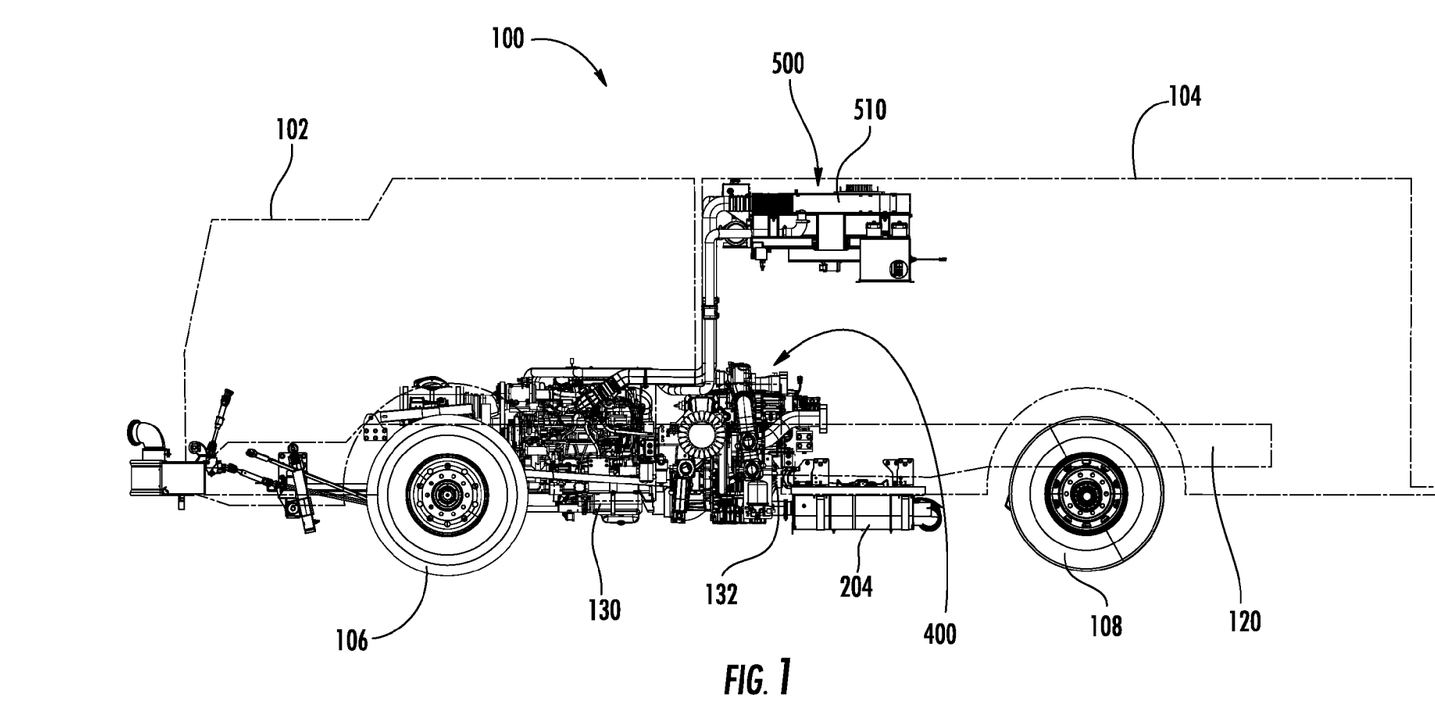
FIG. 1 is a side view of a firefighting vehicle according to an exemplary embodiment.
Figure 2:
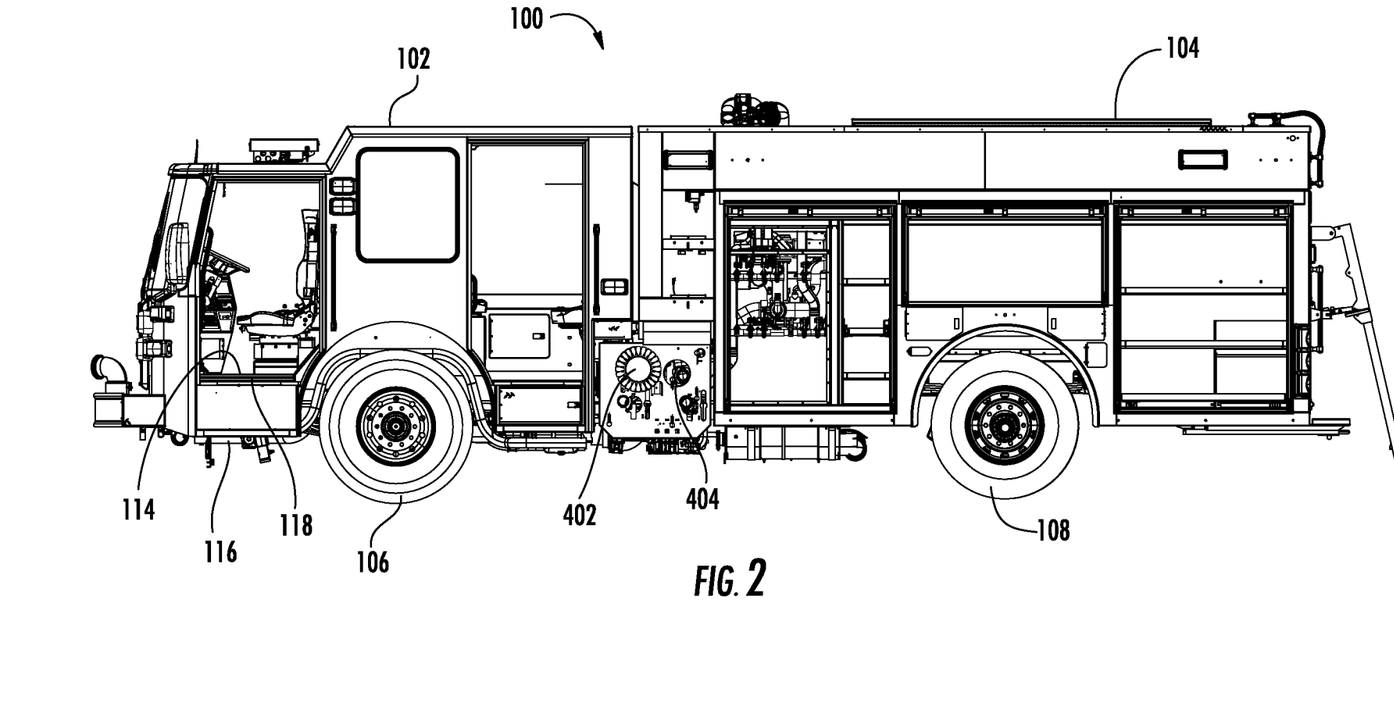
FIG. 2 is another side view of the firefighting vehicle.

Referring to FIGS. 1 and 2 in particular, a firefighting vehicle 100 is shown according to an exemplary embodiment.

Vehicle 100 includes a chassis 120 that supports an operator cab 102 and a body 104 spaced rearward or behind cab 102. Chassis 120 also supports a front wheel assembly, having at least one front wheel 106, and a rear wheel assembly, having at least one rear wheel 108. Cab 102 functions as an operator and/or occupant compartment for vehicle 100 by providing an enclosure or area suitable to receive an operator and/or occupant of the vehicle. Cab 102 includes controls associated with the manipulation of vehicle 100 (e.g., steering controls, throttle controls, etc.) and may optionally include controls associated with one or more auxiliary components of the vehicle 100 (e.g., foaming systems, fire pumps, aerial ladders, turrets, etc.). Cab 102 is carried or otherwise supported at a front end of vehicle 100 with at least a portion of cab 102 extending beyond front wheel 106. Positioning cab 102 in this manner increases the amount of space available along the chassis of vehicle 100 for such things as fire pumps, compartmental storage of equipment, firefighting agent storage tanks, hose beds, etc., while maintaining the overall length of the wheelbase and improving maneuverability.

Figure 3:
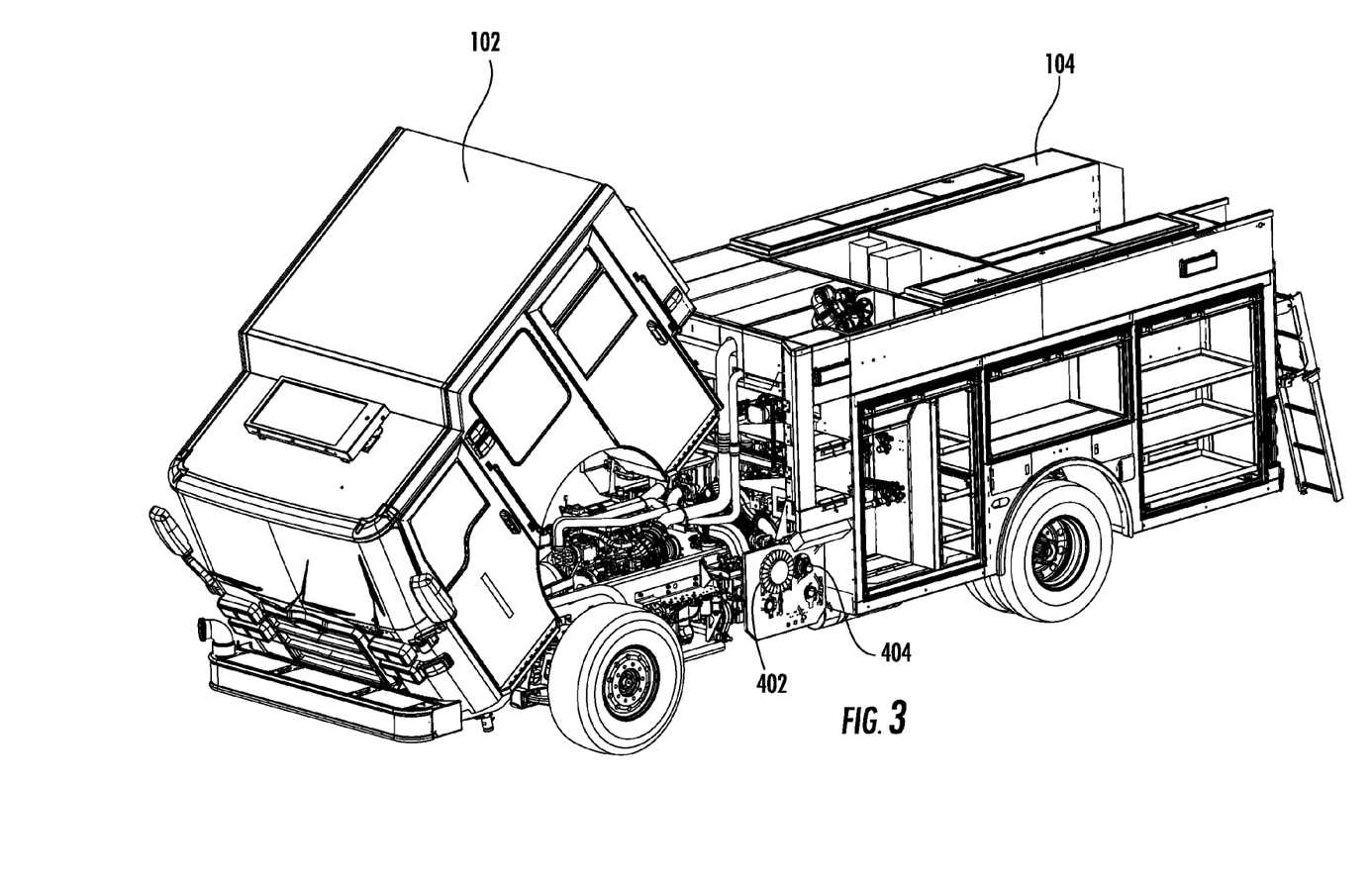
FIG. 3 is a top perspective view of the firefighting vehicle in a service position.

Referring to FIG. 3, cab 102 is shown as being movably (e.g., tiltably, slidably, removably, etc.) supported relative to chassis 120. Cab 102 is configured to be selectively moved between a first or transit position, shown in FIGS. 1 and 2, and a second or service position, shown in FIG. 3. In the service position, systems supported by chassis 120 beneath cab 102 (e.g., an engine, transmission, and/or fire pump, etc.) are more accessible from above chassis 120 than would otherwise be if cab 102 was in the transit position. Movably supporting cab 102 relative to chassis 120 allows for relatively unrestricted or otherwise convenient access to systems that may be supported at least partially under cab 102.

According to the embodiment illustrated, cab 102 is configured to be selectively tilted forward from the transit position to the service position. According to an exemplary embodiment, cab 102 is configured to be tilted forward using one or more powered actuators (e.g., electrical, hydraulic, etc.) up to approximately 45 degrees. A hoist or other suitable lifting means may be used to tilt cab 102 an angular distance greater than 45 degrees. According to the various alternative embodiments, any of a number of techniques may be used to tilt cab 102 to any of a number of positions. A locking or latching device (not shown) may be provided to secure cab 102 in the transit position.

Body portion 104 generally constitutes the portion of vehicle 100 which forms an exterior of vehicle 100 rearward of cab 102. Body portion 104 may be configured to store or otherwise support various components of vehicle 100, such as compressed air foam systems ("CAFS"), storage tanks, firefighting equipment (e.g., warning lights, hoses, nozzles, ladders, tools, etc.). According to the embodiment illustrated, body 104 is configured to house a firefighting agent storage system which comprises one or more tanks or other containers configured to store one or more firefighting agents such as water, foam, fluid chemicals, dry chemicals and the like. For example, the firefighting agent storage system may include a relatively large water tank and a smaller foam tank. Body 104 is also shown including compartmentalized storage for supporting equipment such as ladders, hoses, etc. According to the embodiment illustrated, body 104 also functions as a base for an articulating ladder provided at a rear of body 104.

Figure 4:
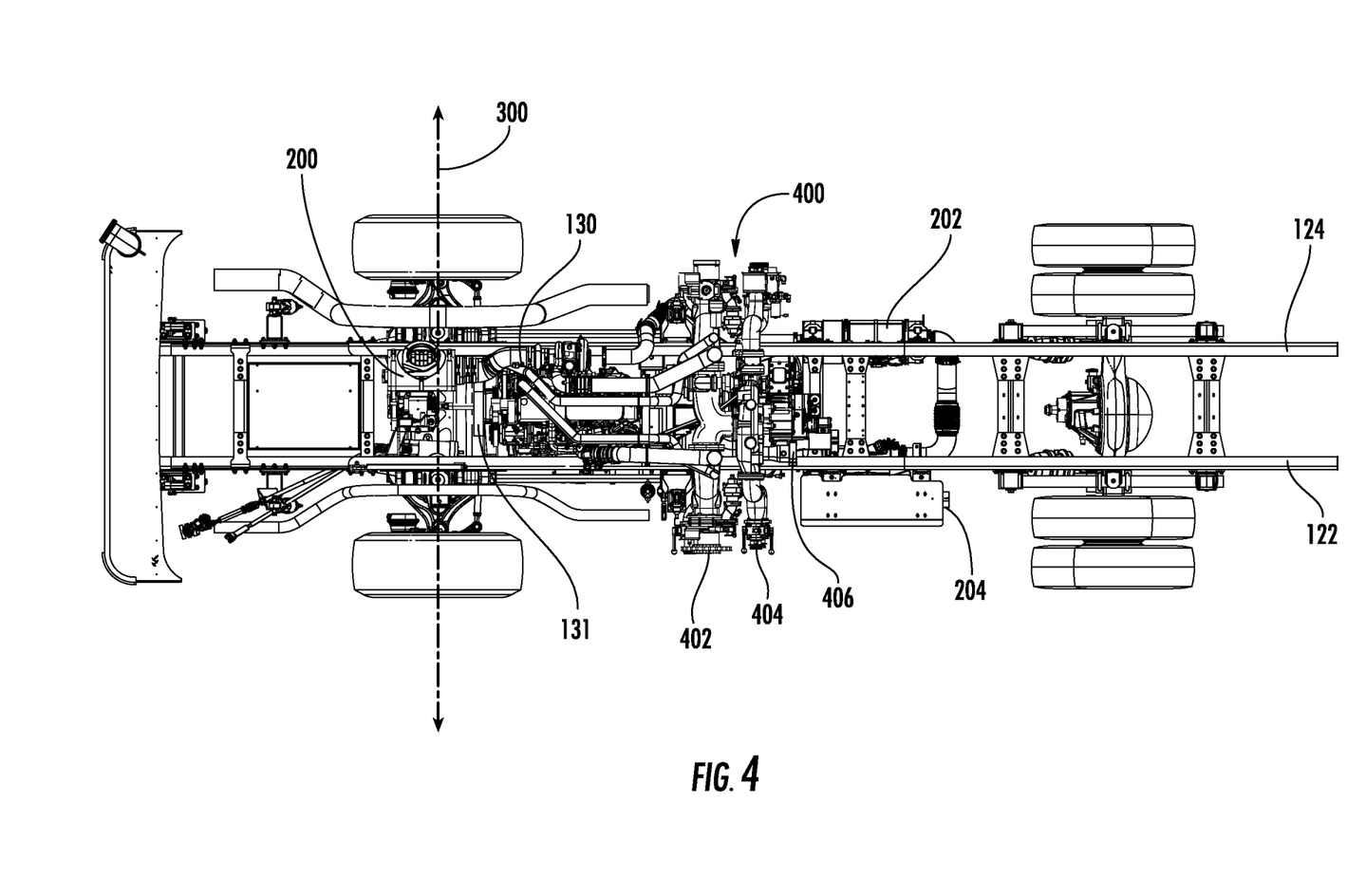
FIG. 4 is a top view of a chassis of the firefighting vehicle according to an exemplary embodiment.

Referring to FIG. 4, chassis 120 extends in a fore and aft direction an entire length of vehicle 100 along a longitudinal center line of vehicle 100 and includes one or more structures configured to serve as a base or foundation for the components of vehicle 100. According to the embodiment illustrated, chassis 120 includes a pair of parallel longitudinally extending frame members or frame rails, shown as a first frame rail 122 (e.g., left side frame member, driver side frame member, etc.), and a second frame rail 124 (e.g., right side frame member, passenger side frame member, etc.).

First frame rail 122 and second frame rail 124 are configured as elongated structural or supportive members (e.g., beams, channels, tubing, etc.). For example, according to the embodiment illustrated, first frame rail 122 and second frame rail 124 are elongated beams having a substantially "C-shaped" cross section with the open portion of the "C" facing the opposing frame member. First frame rail 122 and second frame rail 124 are spaced apart from each other in a lateral (i.e., side-to-side) direction to provide a space for effectively supporting or otherwise receiving certain components of vehicle 100 (e.g., fire pump 400, a generator, a drivetrain, etc.). To support first frame rail 122 and second frame rail 124 in this spaced apart manner, chassis 120 includes one or more transversally extending cross members 128. Cross member 128 is coupled between first frame rail 122 and second frame rail 124 and extends in a direction that is substantially perpendicular to first frame rail 122 and second frame rail 124.

Supported along chassis 120 is an engine 130 that is configured to provide a source of mechanical energy (e.g., rotational movement, etc.) that is derived from an energy source (e.g., a stored energy source, refined petroleum, etc.). The engine may be selected from any suitable engine that is, or may become, commercially available, or the engine may be specifically configured for use with vehicle 100. Examples of suitable engines include, but are not limited to, an internal combustion gas-powered engine, a turbine, a fuel cell driven motor, an electric motor or any other type of motor capable of providing mechanical energy. According to the embodiment illustrated, engine 130 is an internal combustion engine, specifically a diesel engine. Any of the just-mentioned engines may be used alone or in combination with one or more additional power sources (as in a hybrid vehicle) to provide mechanical energy sufficient to power vehicle 100.

Engine 130 is shown as being supported between first frame rail 122 and second frame rail 124 at a front portion of vehicle 100 and under cab 102. According to an exemplary embodiment, engine 130 is supported on chassis 120 such that engine 130 is at least partially supported rearward of an axis of rotation 300 defined by front wheel 106. Axis of rotation 300 is substantially perpendicular to chassis 120 and is formed when the front wheel assembly is aligned substantially parallel to chassis 120 (e.g., when a steering system of vehicle 100 is in a straight position). According to another embodiment, a substantial portion (e.g., a majority, etc.) of engine 130 is supported behind axis of rotation 300. According to the embodiment illustrated, the entire engine 130 is supported behind of axis of rotation 300. In such an embodiment, a front end 131 of engine 130 is positioned rearward of axis of rotation 300, while a rear end of engine 130 remains under cab 102.

Positioning engine 130 in this manner reduces the necessary size of, or eliminates the need for, an engine housing (e.g., doghouse, etc.) that may extend upwardly into a front portion of cab 102, thus increasing the space available in cab 102 for such things as seats, occupants, equipment, etc. According to an exemplary embodiment, positioning engine 130 rearward of axis of rotation 300 allows a floor 114 of cab 102 to be substantially flat, at least in an area extending laterally (i.e., side-to-side) between a front driver side seat and a front passenger side seat, as shown in FIG. 2. According to the embodiment illustrated, floor 114 is substantially flat as it extends laterally across an entire width of cab 102 in this area (e.g., floor 114 is substantially flat as it extends from a driver side front door to a passenger side front door, etc.). Providing a flat floor in a forward portion of cab 102 may advantageously provide improved sightlines within cab 102, may allow for more efficient seating arrangements within cab 102, may create a pass-through area that allows an occupant to efficiently move between a driver side front seat and a passenger side front seat, and/or may provide additional space for supporting one or more controls or consoles associated with vehicle 100.

According to an exemplary embodiment, moving engine 130 rearward along chassis 120 not only allows floor 114 to be substantially flat, but floor 114 is also able to be lowered relative chassis 120, and ultimately relative to the ground. The height of floor 114 relative to the ground may vary depending on a number of factors including, but not limited to, the suspension system, the size of wheels, specific ground clearance requirements, etc. According to an exemplary embodiment, by moving engine 130 rearward along the chassis, floor 114 is able to be lowered to a height that ranges between approximately 30 inches and 40 inches from to a ground surface. According to the embodiment illustrated, floor 114 is approximately 36 inches from a ground surface. According to the various alternative embodiments, the height of floor 114 may be greater or less than the dimensions provided.

The lowering of floor 114 may advantageously allow for improved access to and from cab 102. For example, referring back to FIG. 2, vehicle 100 includes one or more steps, shown as a first or lower step 116 and a second or upper step 118, configured to be used by vehicle occupants as they enter and exit cab 102. By having a lowered floor 114, vehicle 100 is able to lower the height of lower step 116 relative to a ground surface. According to an exemplary embodiment, the height of lower step 116 is able to be lowered the same distance that floor 114 is lowered. Thus, according to the embodiment illustrated, lower step 116 is lowered approximately 4 inches. In its lowered positioned, lower step is approximately 20 inches from a ground surface. With upper step 118 being provided at substantially the same height as floor 114, the distance between lower step 116 and upper step 118 is reduced to approximately 16 inches instead of the typical 18 inches. Reducing the height of lower step 116, and/or the height between consecutive steps, reduces the amount of strain placed upon occupants trying to enter or exit cab 102. Again, according to the various alternative embodiments, the height of lower step 116 and spacing between lower step 116 and upper step 118 may be greater or less than the dimensions provided. Further, the overall number of steps may vary depending on the particular application of vehicle 100.

The lowering of floor 114 may also advantageously allow for the overall height of cab 102 to be reduced. According to an exemplary embodiment, the overall height of cab 102 is able to be lowered the same distance that floor 114 is lowered. Thus, according to the embodiment illustrated, the overall height of cab 102 is lowered approximately 4 inches. Reducing the overall height of cab 102 may allow vehicle 100 to pass under lower obstacles and enter more areas.

Further still, the lowering of floor 114 and the elimination of an engine housing from a front portion of cab 102 may increase the amount of space available on the front of cab 102 for a larger windshield 119. Providing a larger windshield 119 may improve sightlines, thus decreasing the number of blind spots in front of vehicle 100. According to an exemplary embodiment, the bottom of windshield 108 is lowered approximately 10 inches relative to a typical height. In such an embodiment, the bottom of windshield 108 is able to be lowered approximately 4 inches (which is possible because of the lowering of floor 114) and another 6 inches by increasing the height of the windshield (which is possible because of the elimination of an engine housing from a front portion of cab 102). According to the embodiment illustrated, a the bottom edge of windshield 108 is less than approximately 65 inches from a ground surface, and in one exemplary embodiment is approximately 61 inches from a ground surface.

Positioning engine 130 rearward of axis of rotation 300 may also simplify the servicing of vehicle 100 by removing the necessity of reaching around batteries, wheels or other components of vehicle 100 and providing a single point of service. Additionally, positioning engine 130 rearward of axis of rotation 300 and within a wheelbase of vehicle 100 improves vehicle handling by reducing the mass of vehicle 100 outside the wheelbase. Increasing the mass within, and reducing the mass outside of, the wheelbase of vehicle 100 allows for a shorter necessary wheelbase, thus improving vehicle maneuverability. Positioning engine 130 rearward of axis of rotation 300 may also increase the distance between occupants of vehicle 100 and engine 130, which may allow noise levels inside cab 102 to be reduced and/or may improve occupant comfort.

According to the exemplary embodiment, positioning engine 130 rearward of axis of rotation 300 allows the height of engine 130 relative to chassis 120 to be adjusted (e.g., raised, lowered, etc.) without altering the height of floor and/or the seating arrangements within a forward portion of cab 102. Such a result may be advantageous if vehicle 100 is intended to be optionally be equipped with engines having different manufacturers and/or sizes. According to an exemplary embodiment, a top portion of engine 130 is between approximately 15 inches and appropriately 25 inches above a top surface of first frame rail 122 and second frame rail 124. In such embodiments, the percentage of the overall engine height that is above a top surface of first frame rail 122 and second frame rail 124 may vary between approximately 30 percent and approximately 50 percent. Positioning the height of engine 130 within this range may allow engine 130 to sit high enough relative to chassis 120 so as to protect a bottom portion of engine 130 from debris and such things as curbs, speed bumps, and the like, while still having engine 130 sit low enough relative to chassis 120 so as to also provide a lower center of gravity of vehicle 100, thus improving vehicle handling, and reducing the height at which engine 102 extends into a rear portion of cab 102. According to the various alternative embodiments, engine 130 may be supported at any of a variety of heights relative to chassis 120 depending on the particular application.

According to an exemplary embodiment, engine 130 is supported within a cavity that is defined by first frame rail 122, second frame rail 124 and a bottom surface of cab 102, such as a bottom surface of floor 114. According to the embodiment illustrated, floor 114 extends upwardly into a rear portion of cab 102 to form the cavity. In such an embodiment, the cavity, like engine 130, is located rearward of axis of rotation 300.

Further supported along chassis 120 is a fire pump 400 configured to pressurize and pump a firefighting agent from a firefighting agent source (e.g., tank, body of water, hydrant, etc.) so that the pressurized firefighting agent can be supplied to various fluid outlets (e.g., hose connectors, manifolds, turrets, etc.) of vehicle 100. According to an exemplary embodiment, fire pump 400 is coupled to engine 130 and is configured to transfer power and mechanical energy received from engine 130 to pressurize and pump a firefighting agent. As shown, fire pump 400 is configured to receive power from a power take off device such as a rear engine power take off (REPTO) device. According to the various alternative embodiments, fire pump 130 may be coupled to a vehicle transmission and/or any other suitable power source.

According to an exemplary embodiment, fire pump 400 is positioned rearward of engine 130 and at least partially under cab 102. According to the embodiment illustrated, fire pump 400 is positioned along chassis 120 close to a transition area between cab 102 and body 104 so that portions of fire pump 400 are located under both cab 102 and body 104. Positioning fire pump 400 at least partially under cab 102, or substantially close thereto, may advantageously provide easier access to fire pump 400, improved weight distribution of vehicle 100 along chassis 120, and/or convenient access to a power output from engine 130 for driving fire pump 400. According to the various alternative embodiments, fire pump 400 may be located at any of a number of positions along chassis 120 (e.g., forward of engine 130, in the rear of vehicle 100, entirely within body 104, entirely under cab 102, etc.).

According to an exemplary embodiment, fire pump 400 is configured to be similar to the fire pump disclosed in U.S. Pat. No. 7,784,554, issued Aug. 31, 2010, and entitled "Firefighting Vehicle," the disclosure of which is hereby incorporated by reference in its entirety. For example, fire pump 400 includes one or more inlet hose connectors 402 provided on a first side of vehicle 100 (e.g., a driver side, etc.) and one or more outlet hose connectors 404 provided on the opposite second side of vehicle 100 (e.g., a passenger side, etc.). Referring back to FIG. 2, and according to the embodiment illustrated, inlet house connectors 402 are provided along chassis 120 forward of outlet hose connectors 404 and are at least partially under cab 102, while outlet hose connectors 404 as shown as being supported under body 104.

Referring back to FIG. 4, inlet hose connectors 402 and outlet hose connectors 404 are shown as being in fluid communication with a pump housing having a single fluid inlet (e.g., suction port, opening, etc.) and at least two fluid outlets (e.g., exit openings, discharge ports, etc.). The two fluid outlets are configured to be substantially perpendicular to the fluid inlet and face opposites directions. This allows fire pump 400 to be supported on vehicle 100 such that the fluid inlet is parallel with the central axis of vehicle 100 while a fluid outlet outwardly faces each lateral side of the vehicle. Providing a pump housing with two outputs, rather than providing an external plumbing configuration which routes fluid from a single outlet on the pump housing to two or more fire hose connectors, may advantageously allow for a more compact fire pump configuration (e.g., low profile, etc.). Inlet hose connectors 402 and outlet hose connectors 404 may have any of a variety of diameters and/or locations depending on various design criteria, including the particular application, the desired flow rate, etc.

Figure 6:
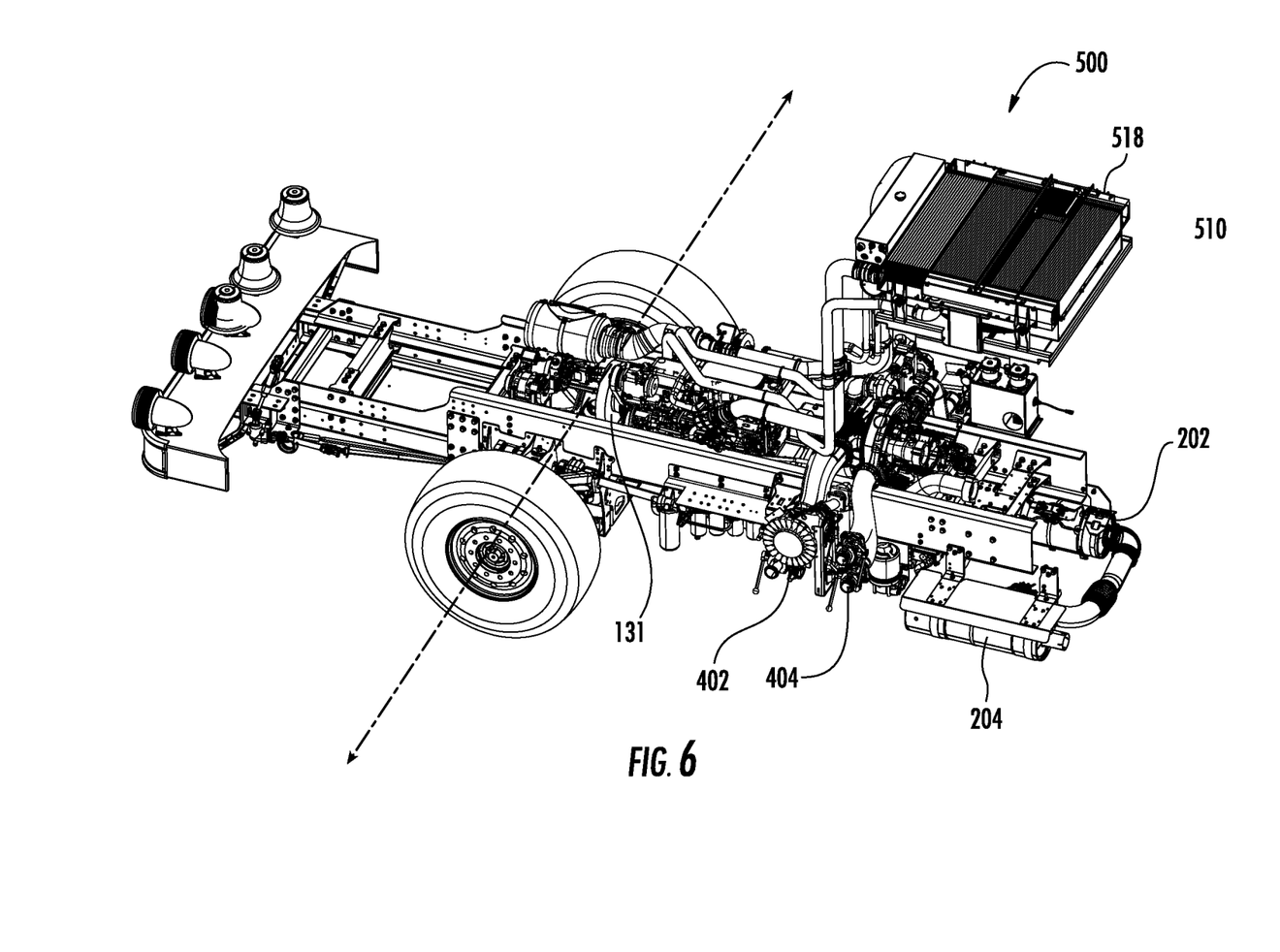
FIG. 6 is a partial top perspective view of the chassis showing a cooling system of the firefighting vehicle according to an exemplary embodiment.

As best shown in FIG. 6, the pump housing also includes an auxiliary fluid outlet 406 provided at a rear end of the pump housing and facing a direction that is substantially perpendicular to the other two fluid outlets. Auxiliary fluid outlet 406 provides a secondary fluid passageway to other areas of the vehicle (e.g., a turret, a water tank, a manifold stack, etc.) rearward of the first fluid outlet and the second fluid outlet. For example, auxiliary fluid outlet 406 may be in fluid communication with manifold supported within body 104.

According to an exemplary embodiment, supported on a driver side of body 104, is an area 112 that is configured to receive a fire pump control panel that is operatively coupled to fire pump 400. The fire pump control panel may include an arrangement of user interfaces (e.g., levers, buttons, switches, etc.), displays, and gauges configured to enable control of fire pump 400 and any other system that may need to be controlled (e.g., CAFS, etc.) and/or to monitor the control of fire pump 400 and any of the other systems. According to the various alternative embodiments, the fire pump controls may be located on a passenger side of body 104, on a back end of body 104, within cab 102 and/or on any other suitable position on vehicle 100.

Also supported along chassis 120 is an exhaust system 200 coupled to engine 130. According to an exemplary embodiment, vehicle 100 includes an exhaust system similar to the exhaust system disclosed in U.S. patent application Ser. No. 12/618,547, filed Nov. 13, 2009, and entitled "Exhaust System for Firefighting Vehicle," the disclosure of which is hereby incorporated by reference in its entirety. Exhaust system 200 includes a first exhaust treatment device (e.g., a mechanical treatment device, etc.), shown as a diesel particulate filter (DPF) device 202, supported by second frame rail 124, and a second exhaust treatment device (e.g., a chemical treatment device, etc.), shown as a selective catalytic reduction converter (SCR) device 204, supported by first frame rail 122. DPF device 202 is employed to remove particulate matter from engine exhaust, while SCR device 204 may be employed to chemically alter the chemical structure of gaseous emissions using a catalyst that retains at least a portion of the noxious emissions as a non-gaseous product of the chemical reaction.

Figure 5:
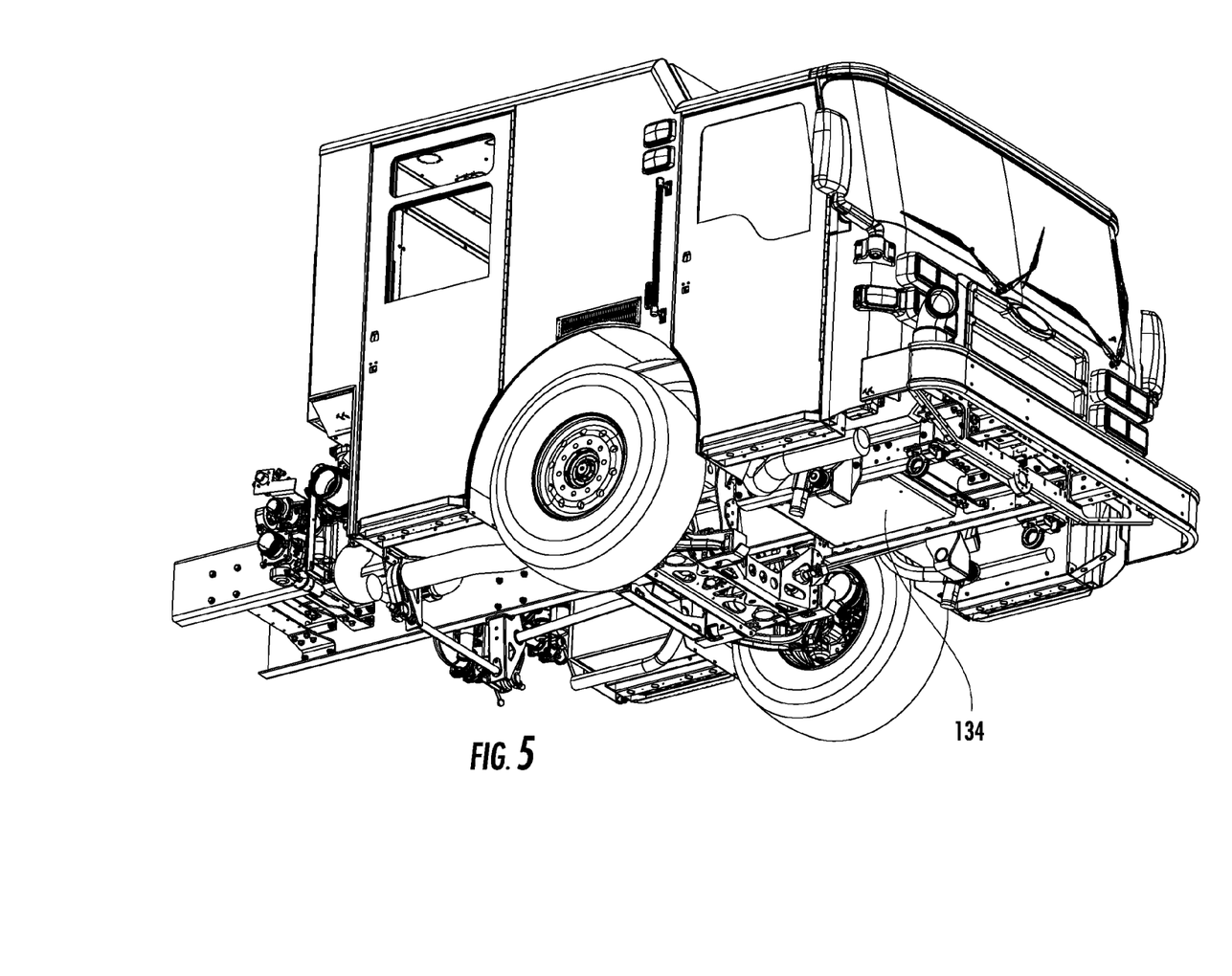
FIG. 5 is a bottom perspective view of firefighting vehicle.

Referring to FIG. 5, vehicle 100 may optionally include a generator 134 supported by chassis 120. If provided, generator 134 may be coupled to engine 130 and configured to convert mechanical energy from engine 130 into electrical energy. The electrical energy may be stored in at least one battery 136 or distributed through vehicle 100 to lights, sirens, power outlets, electric motors, or any other electricity consuming object or system. As shown, generator 134 is located at least partially between front wheels 106 and is configured to receive power from a power take off device such as a front engine power take off (FEPTO) device. According to an exemplary embodiment, generator 134 is supported between first frame rail 122 and second frame rail 124 such that a substantial portion of generator 134 is lower than tops of first and second frame rails 122 and 124. Positioning generator 134 in this manner may reduce or eliminate the need for an engine housing that may extend upwardly into the cab, thus increasing the space available in cab 102 for such things as seats, occupants, equipment, etc. According to another exemplary embodiment, vehicle 100 does not include generator 134, and instead relies on the power output of engine 130 as its primary engine source.

Figure 8:
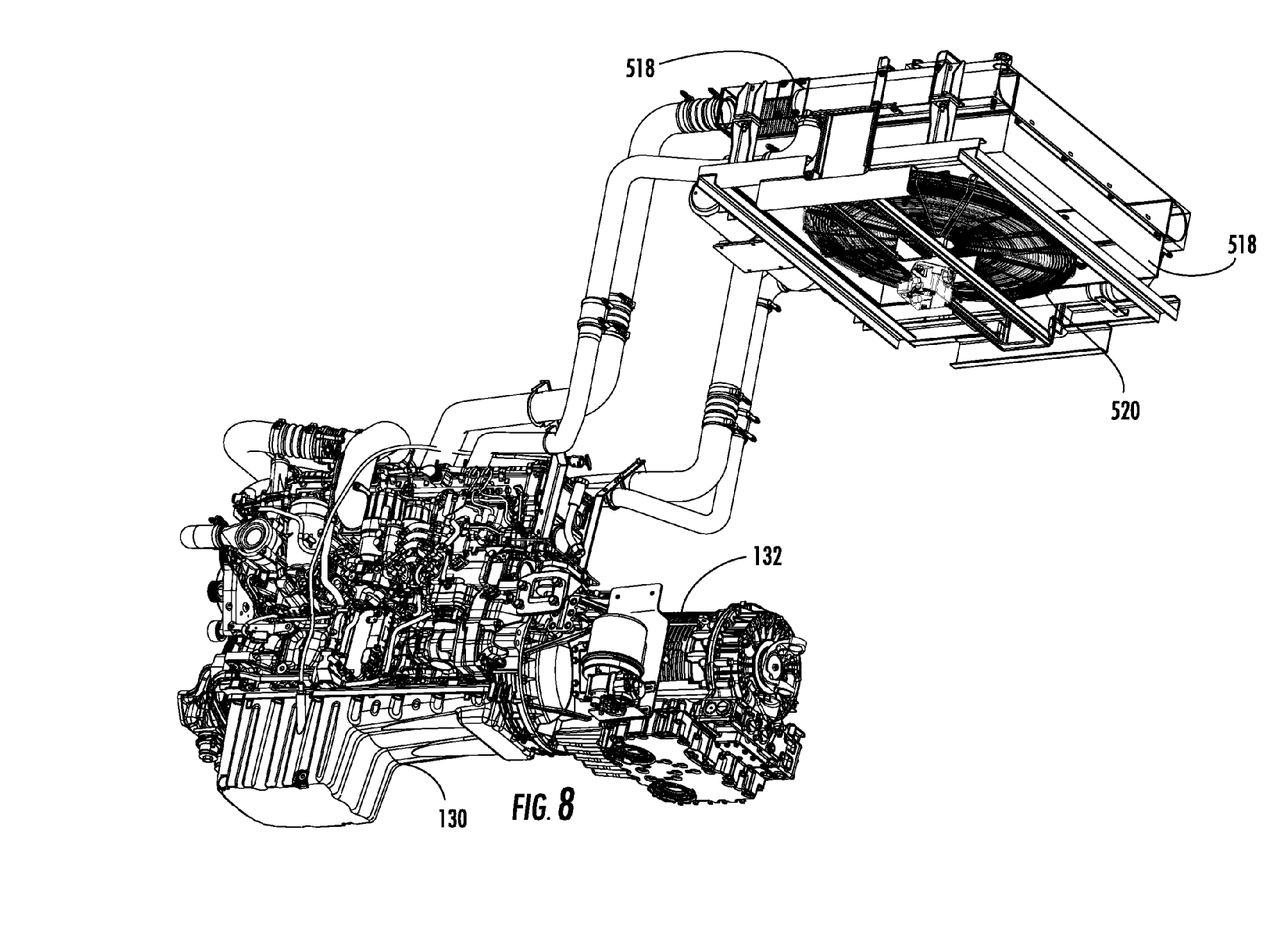
FIG. 8 is a bottom perspective view of the cooling system of the firefighting vehicle.

Referring back to FIG. 1 and also to FIG. 8, further supported along chassis 120 is a transmission 132. Transmission 132 is coupled to engine 130 and is configured to transfer power and mechanical energy received from engine 130 to one or more wheels of vehicle 100, which in turn propel vehicle 100 in a forward or rearward (or other) direction. Transmission 132 may be further configured to transfer power and mechanical energy to one or more components of vehicle 100 (e.g., a fire pump, etc.). Transmission 132 may be any of a variety of suitable transmissions (e.g., standard, split shaft, etc.). According to one exemplary embodiment, transmission 132 is an automatic transmission.

According to the embodiment illustrated, transmission 132 is supported at least partially under cab 102. Typically, a transmission is spaced apart from a fire pump. For example, in a forward-mounted fire pump configuration, the transmission is typically located well behind the fire pump. In a mid-mounted fire pump configuration, the transmission is typically located in-line with the fire pump. According to the embodiment illustrated, transmission 132 is located at least partially underneath fire pump 400. In other words, fire pump 400 is stacked above transmission 132. Positioning transmission 132 and fire pump 400 in this stacked configuration may increase the amount of space available in body 104 for such things as compartmental storage of equipment, firefighting agent storage tanks, hose beds, etc. Furthermore, this manner of positioning may reduce the necessary size of, or eliminates the need for, a transmission housing that may extend upwardly into a front portion of operator cab 102, which increases the space available in cab 102 for such things as a substantially flat floor, seats, occupants, equipment, etc. This positioning may also increase the distance between occupants of vehicle 100 and transmission 132, thus reducing noise levels inside cab 102 and improving occupant comfort. Positioning transmission 132 and fire pump 400 in this manner and proximate to engine 130 may also simplify servicing by providing a single point of service.

Referring to FIGS. 1 and 6-8, a cooling system 500 of vehicle 100 is shown according to an exemplary embodiment. Cooling system 500 is configured to transfer excess heat generated by mechanical components (e.g. an engine, a transmission, a fire pump, etc.) of vehicle 100 to the atmosphere. Dissipating the excess heat allows the mechanical components to run more efficiently and extends their service lives. Cooling system 500 generally includes a heat exchanger, shown as a radiator 510, that is coupled to engine 130 via conduit system. According to an exemplary embodiment, radiator 510 is removed from a typical radiator position, which is under the operator cab and forward of the engine. Instead, radiator 510 is located rearward of cab 102 and engine 130. According to the embodiment illustrated, radiator 510 is located within body 104. More particularly, radiator 510 is shown as being supported in a front top portion of body 104. Radiator 510 is shown disposed in a substantially horizontal position, and cooling elements, such as fins 518, are shown disposed in a substantially vertical position. According to the various alternative embodiments, radiator 510 may be supported at any of a number of orientations within body 104 and/or at any of a number of locations rearward of cab 102 including, but not limited to, the space between cab 102 and body 104.

Referring to FIG. 8 in particular, an underside view of cooling system 500 is shown according to an exemplary embodiment. As shown, cooling system 500 includes a fan 520 configured to blow air across fins 518 of radiator 510. In such an embodiment, body 104 may be configured to provide one or more pathways for atmospheric air to reach fan 520. According to an exemplary embodiment, cooling system 500 may be configured so that aerodynamic effects created when vehicle 100 is in motion draw or push air through radiator 510. Configuring cooling system 500 and body 104 in such manners increases airflow across fins 518, thus increasing the cooling ability of radiator 510.

Referring back to FIGS. 6-8, radiator 510 is shown as being in fluid communication with engine 130 by a first coolant line 512 and a second coolant line 514. First coolant line 512 and second coolant line 514 may be made of rubber, plastic, metal, or other suitable material. According to an exemplary embodiment, first coolant line 512 and second coolant line 514 are at least partially supported within a front portion of body 104. As shown, first coolant line 512 is configured to carry engine coolant from engine 130 to radiator 510, and second coolant line 514 is configured to carry engine coolant from radiator 510 to engine 130. In such embodiments, radiator 510 is configured to transfer heat from the engine coolant to the atmosphere, either directly or through an intermediate cooling medium. According to the embodiment illustrated, cooling system 500 includes a coolant storage tank 516, which is configured to compensate for a change in coolant volume caused by a change in coolant temperature.

Figure 7:
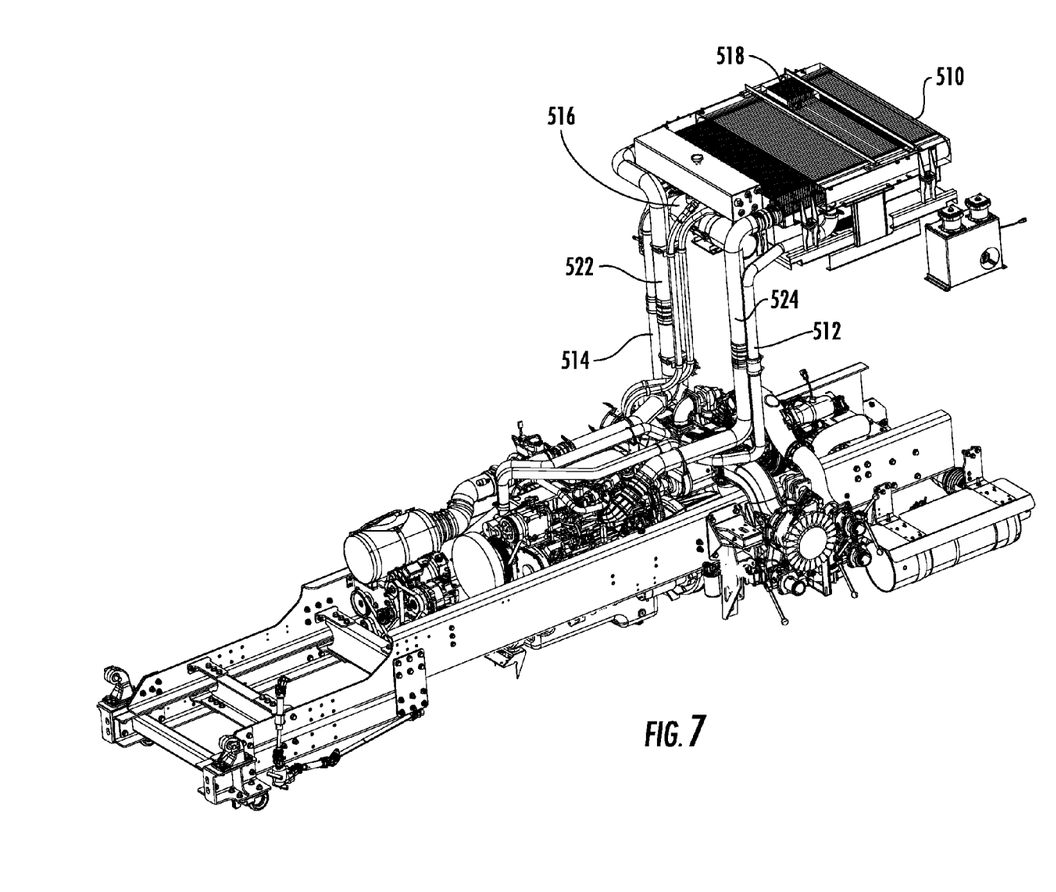
FIG. 7 is another partial top perspective view of the chassis showing the cooling system of the firefighting vehicle.

Radiator 510 is also shown as being fluidly coupled to engine 130 by a first air line 522 and a second air line 524. First air line 522 and second air line 524 may be made of rubber, plastic, metal, or other suitable material. According to an exemplary embodiment, first air line 522 and second air line 524 are at least partially supported within a front portion of body 104. As shown, first air line 522 is configured to carry charge air from a compressor 526 to radiator 510. According to the various alternative embodiments, the compressor may be a turbocharger, supercharger, or other compressor known to a person of skill in the art. Second air line 524 is shown as being configured to carry air from radiator 510 to engine 130. In such embodiments, radiator 510 is configured to transfer heat from the charge air to the atmosphere, either directly or through an intermediate cooling medium.

As detailed above, cooling system removes radiator 510 from a typical position which is at a front portion of an operator cab forward of the engine. Removing radiator 510 from under cab 102 and in front of engine 130 eliminates the need for an engine or cooling tunnel between the radiator and a front portion of the engine. Eliminating the engine or cooling tunnel allows vehicle 100 to provide cab 102 with a substantially flat floor 114, at least in a front portion of cab 102, and with a floor 114 that can be lowered relative to chassis 120. As noted above, such a configuration may increase the amount of space available in cab 102 for such things as seats, occupants, equipment, etc. and enabling a lowering of a lower step 116 and an upper step 118. Such a configuration may also protect radiator 510 by distancing radiator 510 from road debris, etc. It may also improve servicing access to radiator 510 by removing the radiator from a typical enclosed position under the operator cab, by providing ample space on top of vehicle 100 to position a mechanic and tools, and by allowing radiator 510 to be lifted off of the top of vehicle 100. According to the various alternative embodiments, radiator 510, and the other components of cooling system 500, may be supported at any of a number of positions within vehicle 100.

It is also important to note that the construction and arrangement of the elements of vehicle 100, engine 130, transmission 132, fire pump 400, and/or cooling system 500 as shown in the exemplary embodiments are illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the firefighting vehicle may be constructed from any of a wide variety of materials that provide sufficient strength or durability, in any of a wide variety of colors, textures and combinations. Accordingly, all such modifications are intended to be included within the scope of the present inventions. Other substitutions, modifications, changes and omissions may be made in the design, operating conditions and arrangement of the preferred and other exemplary embodiments without departing from the spirit of the appended claims.

The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the appended claims.

What is claimed is:

1. A firefighting vehicle comprising:
 a chassis;
 a front wheel assembly coupled to the chassis and having at least one front wheel defining an axis of rotation that is substantially perpendicular to the chassis when in a straight position;
 an operator cab supported at a front portion of the chassis, the operator cab having a floor section extending laterally across a width of the operator cab in an area of a driver seat and passenger seat that is forward of the axis of rotation, the floor section being substantially flat and having a height that is less than approximately 40 inches from a ground surface;
 an engine supported by the chassis, the engine being disposed under the operator cab and at least partially rearward of the axis of rotation; and
 a cooling system coupled to the engine and having a heat exchanger, wherein the heat exchanger is supported in a substantially horizontal orientation on top of a body portion of the vehicle, the body portion being supported on the chassis rearward of the operator cab.

2. The firefighting vehicle of claim 1, further comprising a fire pump supported by the chassis.

3. The firefighting vehicle of claim 2, wherein the fire pump is supported rearward of the engine.

4. The firefighting vehicle of claim 3, wherein the fire pump is at least partially disposed under a rear portion of the operator cab.

5. The firefighting vehicle of claim 1, wherein the operator cab includes a front windshield that is positioned such that a lower edge of the front windshield is less than approximately 65 inches from the ground surface.

6. The firefighting vehicle of claim 1, wherein the cooling system comprises a fan supported under the heat exchanger in a substantially horizontal orientation.

7. The firefighting vehicle of claim 1, wherein a front end of the engine is positioned rearward of the axis of rotation.

8. The firefighting vehicle of claim 1, wherein the body portion is configured to support at least one of a tank, a storage area and a hose bed.

9. A firefighting vehicle comprising:
 a chassis;
 a front wheel assembly coupled to the chassis and having at least one front wheel defining an axis of rotation that is substantially perpendicular to the chassis when in a straight position;
 an operator cab supported at a front portion of the chassis, the operator cab having a floor section extending laterally across a width of the operator cab in an area forward of the axis of rotation, the floor section being substantially flat;
 an engine supported by the chassis, the engine disposed under the operator cab with a front end of the engine being positioned rearward of the axis of rotation;
 a fire pump supported by the chassis rearward of the engine; and
 a transmission coupled to the engine, the transmission being disposed at least partially beneath the fire pump.

10. The firefighting vehicle of claim 9, wherein the floor section has a height that is less than approximately 40 inches from a ground surface.

11. The firefighting vehicle of claim 9, wherein the fire pump is at least partially disposed under a rear portion of the operator cab.

* * * * *